United States Patent
Sedaghat et al.

(10) Patent No.: US 12,423,151 B2
(45) Date of Patent: Sep. 23, 2025

(54) MULTI-TENANT REAL-TIME PROCESS CONTROLLER FOR EDGE CLOUD ENVIRONMENTS

(71) Applicant: Telefonaktiebolaget LM Ericsson (PUBL), Stockholm (SE)

(72) Inventors: Mina Sedaghat, Solna (SE); Pontus Sköldström, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 490 days.

(21) Appl. No.: 17/782,066

(22) PCT Filed: Dec. 13, 2019

(86) PCT No.: PCT/SE2019/051276
§ 371 (c)(1),
(2) Date: Jun. 2, 2022

(87) PCT Pub. No.: WO2021/118420
PCT Pub. Date: Jun. 17, 2021

(65) Prior Publication Data
US 2023/0008176 A1    Jan. 12, 2023

(51) Int. Cl.
G06F 9/46    (2006.01)
G06F 9/50    (2006.01)

(52) U.S. Cl.
CPC .......... G06F 9/5038 (2013.01); G06F 9/5072 (2013.01)

(58) Field of Classification Search
CPC .............................. G06F 9/5038; G06F 9/5072
See application file for complete search history.

(56) References Cited

U.S. PATENT DOCUMENTS

2014/0013330 A1 *    1/2014    Wang ................. G06F 9/524
                                                             718/103

FOREIGN PATENT DOCUMENTS

EP           1 693 748 A2    8/2006
WO      2019 029831 A1    2/2019

OTHER PUBLICATIONS

Paul Menage, CGroups, Documentation/cgroup-v1/cpusets.txt—Aug. 7, 2019.
(Continued)

*Primary Examiner* — Gregory A Kessler
(74) *Attorney, Agent, or Firm* — Baker Botts L.L.P.

(57) ABSTRACT

The present disclosure relates to a method performed by a process control node (210) configured to allocate resources shared by a plurality of tenant applications, wherein each tenant application comprises a selection of non real-time processes and real-time processes, the method comprising receiving a first resource request, from a tenant application, indicative of resources requested to be allocated, by the process control node, for one or more real-time processes of the tenant application, evaluating a scheduling test to determine if the set of processing resources can be allocated from the shared resources by determining if resources requested by the first resource request can be allocated, and if it is determined that the requested resources can be allocated from the shared resources, the method further comprises performing the steps starting the one or more real-time processes of the tenant application within a resource partition of the tenant application, calculating updated resource quotas and priorities for non real-time processes comprised by the tenant application, transmitting a first resource response to the tenant application.

8 Claims, 8 Drawing Sheets

(56) References Cited

OTHER PUBLICATIONS

Deadline Task Scheduling; https://www.kernel.org/doc/Documentation/scheduler/sched-deadline.txt—Aug. 7, 2019.
PCT International Search Report issued for International application No. PCT/SE2019/051276—Aug. 14, 2020.
PCT Written Opinion of the Internatinoal Searching Authority issued for International application No. PCT/SE2019/051276—Aug. 14, 2020.

\* cited by examiner

MULTI-TENANT REAL-TIME PROCESS CONTROLLER FOR EDGE CLOUD ENVIRONMENTS

PRIORITY

This nonprovisional application is a U.S. National Stage Filing under 35 U.S.C. § 371 of International Patent Application Serial No. PCT/SE2019/051276 filed Dec. 13, 2019 and entitled "A MULTI-TENANT REAL-TIME PROCESS CONTROLLER FOR EDGE CLOUD ENVIRONMENTS" which is hereby incorporated by reference in its entirety.

TECHNICAL FIELD

The present invention relates to a method for process control in an edge cloud environment.

BACKGROUND

Applications and services are commonly provided using cloud technology. Commonly a central cloud is connected to a communications network, and is providing applications and services to devices coupled to and/or connected to the communications network.

There is an existing trend of shifting provided applications/services closer to the edge of the communications network, e.g. to edge clouds that may be comprised in vehicles, such as cars and sea vessels. The number of edge clouds supporting that trend, has been growing exponentially all around the globe. Looking ahead, the number of edge clouds may increase by orders of magnitude. The edge clouds may send content and applications/apps to users over shorter lengths of fiber and wireless network hops, supporting the ultra-low latency and extreme throughput demanded by different industry use cases, such as IoT, 5G use cases, augmented reality use cases, virtual reality use cases.

A particular edge cloud application is embedded systems. An embedded system is a computing system, designed for a specific function, often with real-time computing constraints. They are controlled by a real-time operating system, often deployed on a dedicated hardware device. These devices often have limited storage and computing resources, while having strong latency requirements, which makes them a good candidate for using edge cloud platforms to extend their computational and storage capacity.

A drawback with conventional systems, is that when launching new real-time processes, they may interfere or use resources assured for or promised to non real-time processes already running.

Thus, there is a need for an improved method for extending computational and storage capacity, in particular for nodes in edge cloud environments.

SUMMARY OF THE INVENTION

The above described drawbacks are overcome by the subject matter described herein. Further advantageous implementation forms of the invention are described herein.

According to a first aspect of the invention the objects of the invention is achieved by method performed by a process control node configured to allocate resources shared by a plurality of tenant applications. Each tenant application comprises a selection of non real-time processes and real-time processes. The method comprises the steps of receiving a first resource request, from a tenant application, indicative of resources requested to be allocated, by the process control node, for one or more real-time processes of the tenant application, evaluating a scheduling test to determine if the set of processing resources can be allocated from the shared resources by determining if resources requested by the first resource request can be allocated, and if it is determined that the requested resources can be allocated from the shared resources, the method further comprises performing the steps of starting the one or more real-time processes of the tenant application within a resource partition of the tenant application, calculating updated resource quotas and priorities for non real-time processes comprised by the tenant application and transmitting a first resource response to the tenant application.

At least one advantage of the first aspect is that edge (multi-tenant) platforms can execute real-time applications without violating the other tenants resource allocations.

According to a second aspect of the invention the objects of the invention is achieved by a method performed by a second node configured to allocate resources from a set of resources controlled by the second node, the method comprising receiving a resource request, from a process control node, indicative of resources requested to be allocated by the second node, evaluating a scheduling test by determining if the resources requested by the resource request can be allocated and sending a resource response, to the process control node, indicative of the determination. If the requested resources can be allocated from the set of resources controlled by the second node, the method further comprises the steps receiving a start request, from the process control node, indicative of instructions to start one or more real-time processes of a tenant application on the second node, starting the one or more real-time processes of the tenant application and sending a start response, to the process control node.

According to a third aspect of the invention the objects of the invention is achieved by a process control node configured to allocate resources shared by a plurality of tenant applications, wherein each tenant application comprises a selection of non real-time processes and real-time processes, the control node comprising processing circuitry, a memory comprising instructions executable by the processing circuitry, causing the processing circuitry to receive a first resource request, from a tenant application, indicative of resources requested to be allocated, by the process control node, for one or more real-time processes of the tenant application, evaluate a scheduling test to determine if the set of processing resources can be allocated from the shared resources by determining if resources requested by the first resource request can be allocated, and if it is determined that the requested resources can be allocated from the shared resources, the processing circuitry is further caused to perform the steps to start the one or more real-time processes of the tenant application within a resource partition of the tenant application, to calculate updated resource quotas and priorities for non real-time processes comprised by the tenant application and to transmit a resource response to the tenant application.

According to a fourth aspect of the invention the objects of the invention is achieved by a node configured to allocate resources from a set of resources controlled by the node, the control node comprising processing circuitry, a memory comprising instructions executable by the processing circuitry, causing the processing circuitry to receive a resource request, from a process control node, indicative of resources requested to be allocated by the node, evaluate a scheduling test by determining if the resources requested by the resource request can be allocated, send a resource response, to the process control node, indicative of the determination. If the requested resources can be allocated from the set of resources controlled by the node, the processing circuitry is further caused to perform the steps to receive a start request, from the process control node, indicative of instructions to start one or more real-time processes of a tenant application on the node, to start the one or more real-time processes of the tenant application, to send a start response, to the process control node.

According to a fifth aspect of the invention the objects of the invention is achieved by a computer program comprising computer-executable instructions for causing a node, when the computer-executable instructions are executed on processing circuitry comprised in the node, to perform any of the method steps according to the first or second aspect.

According to a sixth aspect of the invention the objects of the invention is achieved by a computer program product comprising a computer-readable storage medium, the computer-readable storage medium having the computer program according to the fifth aspect embodied therein.

According to a seventh aspect of the invention the objects of the invention is achieved by a carrier containing the computer program according to the fifth aspect, wherein the carrier is one of an electronic signal, optical signal, radio signal, or computer readable storage medium.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly

Figure 1:
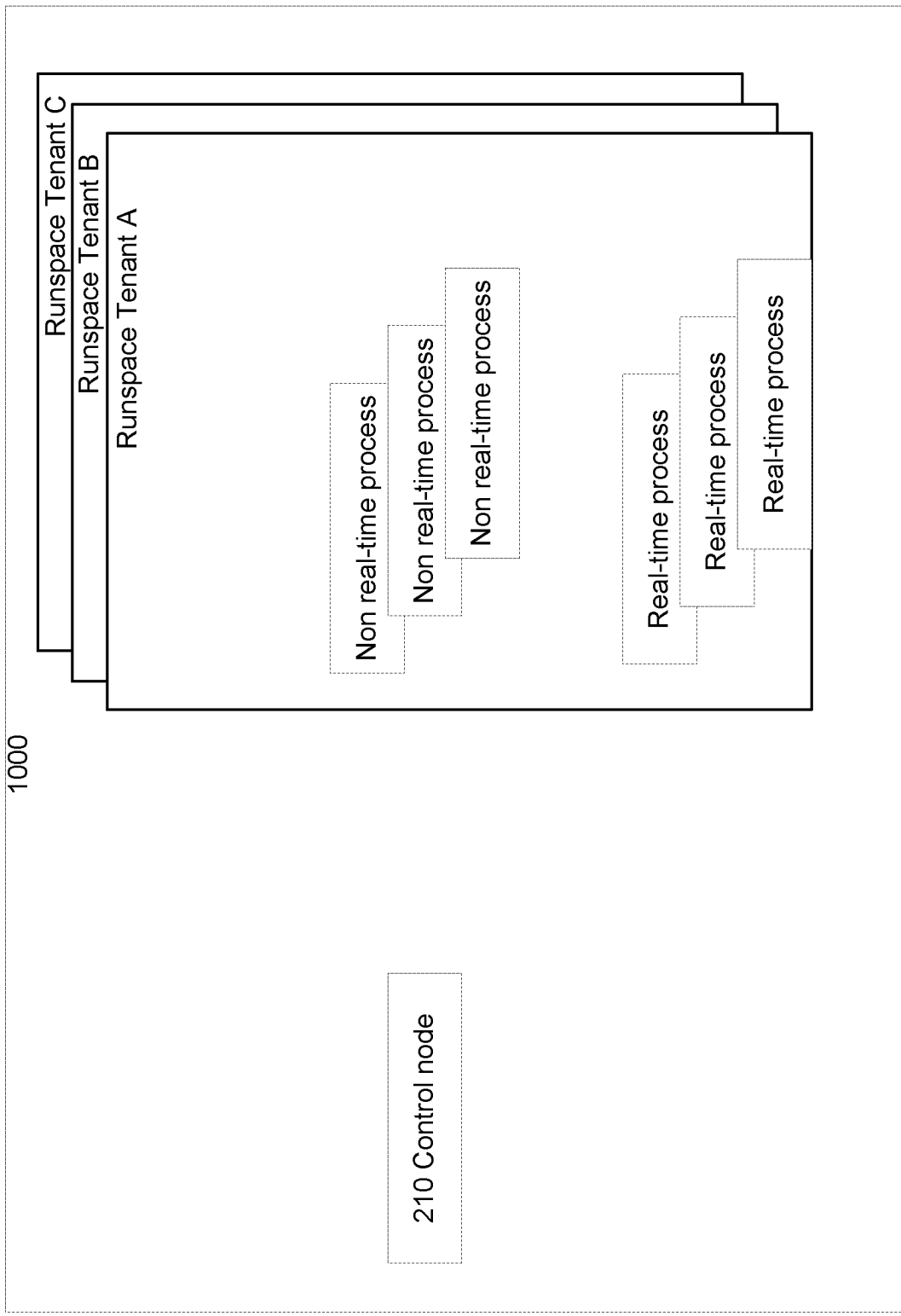
FIG. 1 shows a node according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the present disclosure, the term "shared resources" is used interchangeably with "available resources" and denotes resources available for allocation to multiple applications and/or processes.

In the present disclosure, the term "schedulability test" is used interchangeably with the term "scheduling test" and denotes evaluating if resources, typically shared by a plurality of tenant applications, can be allocated from a pool of resources. E.g. to determine if processing resources to run a process can be allocated.

Autonomous stationary or moving entities (such as factory edge system or vehicles, e.g. cars and sea vessels) may carry a small datacenter, i.e. an edge cloud that can be connected to larger datacenters, i.e. a local/regional/central cloud.

Currently such edge cloud solutions or real time systems are typically deployed on dedicated hardware devices. These devices are usually specialized hardware running real-time operating systems with no support for multi-tenancy. Contrarily, edge cloud, and in general the cloud platforms, are inherently multi-tenant environments. In a multi-tenant environment, the resources, such as computational or memory resources, are shared and multiplexed among multiple tenants or applications.

To be able to execute a real-time application on an edge cloud platform, the platform should be able to provide real-time guarantees, while maintaining the resource allocations, assured or promised to other tenants running non real-time processes. In other words, it is much more complicated to guarantee a deadline for a real-time process, when the resources are shared between multiple tenants with different resource requirements, i.e. real time resource requirements as well as non real time resource requirements.

The orchestration systems in a multi-tenant environment relies on the built-in mechanisms in the server's operating systems, e.g. the Linux operating system. Mechanisms such as control groups (cgroups), allows the resources to be shared between different tenant applications whilst enforcing resource control.

Scheduling of real-time processes, requires stricter guarantees on exactly when a process will run. In Linux, this is done through an admission and scheduling mechanism, implementing the Earliest Deadline First (EDF) algorithm, augmented with a tasks isolation behavior called Constant Bandwidth Server (CBS), see e.g. https://www.kernel.org/doc/html/latest/scheduler/sched-deadline.html To start a real time process, the EDF algorithm uses the following three parameters to decide whether to admit or reject the real time process.

Period: How many microseconds a period consists off.

Runtime: How many microseconds of CPU time the process will receive per period.

Deadline: How soon from the beginning of the period the runtime must be available.

In other words, a resource scheduling period, a requested runtime period being a fraction of the scheduling period, and a maximum delay from a start of the resource scheduling period when the process can be allowed to run/execute. The resource scheduling period or period typically has a limited duration, which is split into fractions and allocated to different tenant applications during the resource scheduling period.

The EDF admission control of a process control node examines whether accepting the new real time process, with the specified runtime, period and deadline constraints can lead to missing deadlines of other already admitted real-time processes in the system.

While cgroups provide supports for multi-tenancy applications on a single server, and EDF+CBS algorithms provides guarantees for real time processes, these two mechanisms are running completely independent from each other.

Conventional solutions therefore have the disadvantage that there is no mechanism to schedule real time processes without simultaneously violating resource controls in a multi-tenant environment or without hurting the non real-time processes running in other tenant applications. The real-time processes will always be prioritized over a non real-time processes, regardless of other tenant applications' resource requirements, and they may preempt and disrupt the non real-time processes if needed.

In other words, there is no support in conventional solutions for scheduling real-time processes in a multi-tenant environment, such as an edge cloud node, without potentially breaching the other tenants resource guarantees. In such a scenario, the tenant applications can directly start real time processes and their real time process would consume resources, (mainly CPU time), which are already promised or guaranteed for use by other tenants, without anything restricting the startup. To provide real-time guarantees for such critical services, there is a need to implement supports for multi-tenancy in the real time operating system. In particular real time operating systems in edge clouds.

In the present disclosure, a control mechanism in the form of a process control node is proposed, aimed to provide real-time guarantees to real-time applications in a multi-tenant environment, without interfering with the other tenant applications' allocated resources. The control mechanism ensures that real-time processes can be started in a multi-tenant scenario without one tenant being able to "steal" resources reserved for another tenant application. The process control node will be responsible for admitting and executing real time processes within a multi-tenant environment.

FIG. 1 shows a node or computer system 1000 according to one or more embodiments of the present disclosure. The computer system is further described in relation to FIG. 7. The computer system 1000 comprises a multi-tenant environment with a plurality of tenant applications A-C. The computer system 1000 comprises the process control node 210 and multiple resource partitions or run spaces or container namespaces of the tenant applications, denoted "Runspace Tenant A", "Runspace Tenant C" and "Runspace Tenant C" in FIG. 1. It is understood that the process control node 210 may optionally or alternatively be arranged externally to and communicatively coupled the computer system 1000, without deviating from the teaching of the present disclosure. One example of such resource partitions are namespaces in a Linux kernel, where partitions are made of kernel resources, such that one set of processes sees one set of resources while another set of processes sees a different set of resources. See e.g. https://en.wikipedia.org/wiki/Linux_namespaces.

As can be seen in FIG. 1, each run space for each tenant application comprises a selection of non real-time processes and real-time processes.

Figure 2:
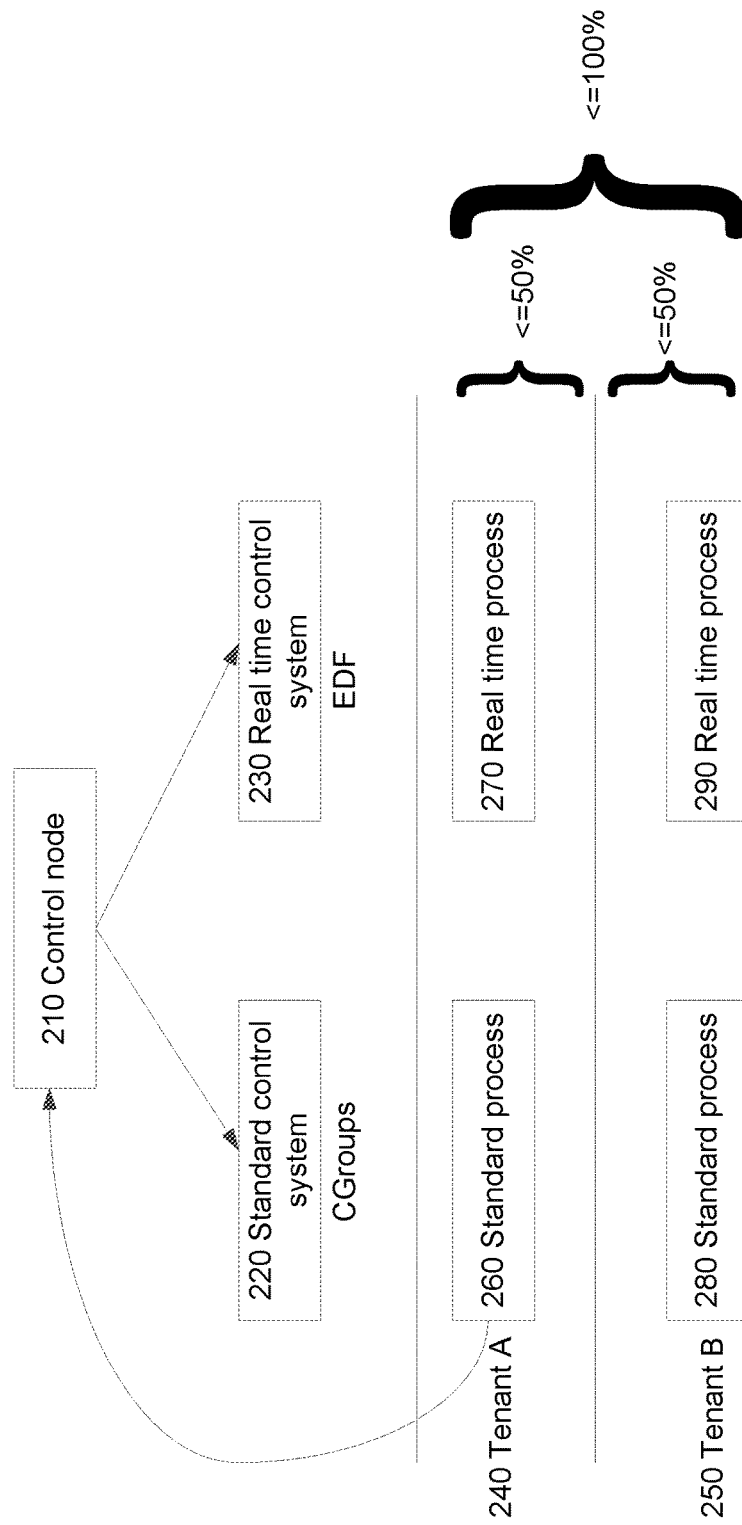
FIG. 2 illustrates the operation of a process control node according to one or more embodiments of the present disclosure.

FIG. 2 illustrates the operation of a process control node 210 according to one or more embodiments of the present disclosure. The process control node 210 or the multi-tenant real-time, RT, controller role is shown in relation to cgroups and linux EDF control systems.

The proposed process control node 210 would spawn the real-time process on behalf of the tenant application. Having an external entity or apparatus in the form of the process control node 210 would ensure the enforcements of resource quotas and the tenant with real-time processes would not preempt processes from other tenants but itself. The process control node 210 or multi-tenant RT controller would therefore:

Prohibit a tenant application from directly spawning a real-time process, thereby ignoring and potentially violating the established normal quota assigned to other tenant applications.

Evaluating if a real-time process should be accepted or by performing an admission control process. The admission decision may e.g. factor in both system and the tenant application's policies.

Ensuring, on a system level, that the resource requirements of any real-time process does not exceed the tenant's total resource limits or thresholds.

Ensuring, on a tenant application level, that the resource requirements of any real-time process does not violate assurances made to the tenant applications' own non real-time processes and thus effectively stealing their resources. I.e. the tenant can define stricter admission policies. The tenant application can specify that the real-time process should not be accepted if there is a risk on disturbing its own non real-time processes.

In the example shown in FIG. 2, tenant applications A 240 and B 250 have been assigned a maximum threshold of 50% CPU time each, which is enforced by the process control node 210. To start a new real-time process, a non real-time process of a tenant application sends a request to the process control node 210. It its understood that other components or nodes could originate such a request.

An advantage with the proposed solution is that capabilities of an edge platform can be expanded to support real time use-case scenarios in its multi-tenant environment. It would allow real-time processes to be executed on shared platforms such as Edge cloud nodes and cloud nodes, without violating the multi-tenancy principles.

In a further example, where each node in an edge cluster runs a process control node 210 or a multi-tenant RT controller. The process control node 210 would then perform the steps:

Step 1. Admission:
  a. Receiving resource requests, from a tenant application, to start one or more real-time processes, each process annotated with the three parameters of a resource scheduling period, a requested runtime period being a fraction of the scheduling period, and a maximum delay from a start of the resource scheduling period, i.e. Runtime, Period and Deadline described previously in the initial paragraphs of the description.
  b. Run a schedulability test or evaluating a scheduling test to decide whether the new real-time process can be scheduled or not, given already started real time and non real-time processes:
  i. Calculating the EDF value, EDF value=Sum the Runtimes/Period values for other real-time processes of the same tenant.
  c. Compare the EDF value to total assigned quota to the tenant, e.g. 50% per second. If the new value is below the assigned quota, the new real-time request is admitted!
Step 2. Execution:
  a. Start the real-time process within the tenant application's resource partition or container namespace, and setting the requested EDF parameters.
    i. To prevent the tenant application process to change it's own scheduling requirements, the necessary library/system calls are disabled for the tenants real-time process by the multi-tenant RT controller.
  b. Re-adjust the tenant's quotas and priorities of non real-time processes, so that the sum of real-time and non real-time process quota matches the total assigned quota.
  c. Transmitting a resource response to the tenant application or reply to the request with either an identifier of the newly started process in case of success, or with an error code in case of failure.

In one variation or embodiment of the present disclosure, networking resources are also requested and/or reserved for real-time processes for which the resource request is sent.

In on embodiment, the tenant application could also include networking parameters for the real-time process when sending a resource request to the proposed process control node 210. The process control node 210 could then configure the network subsystem to provide certain networking resources, such as queuing guarantees, within the operating system, to ensure that computation requests/messages are not left for non-deterministic times in the internal networking queues.

For the networking resources, like the CPU time resource, rules can be applied to divide or reserve part of the incoming buffer space for prioritized messages as appropriate based on the per-tenant application quotas. This extends the disclosed method by adding steps for checking availability of internal network resources and allocating them before 1) admitting the real-time process, and 2) transmitting the resource response or replying to the originator of the request.

Figure 3:
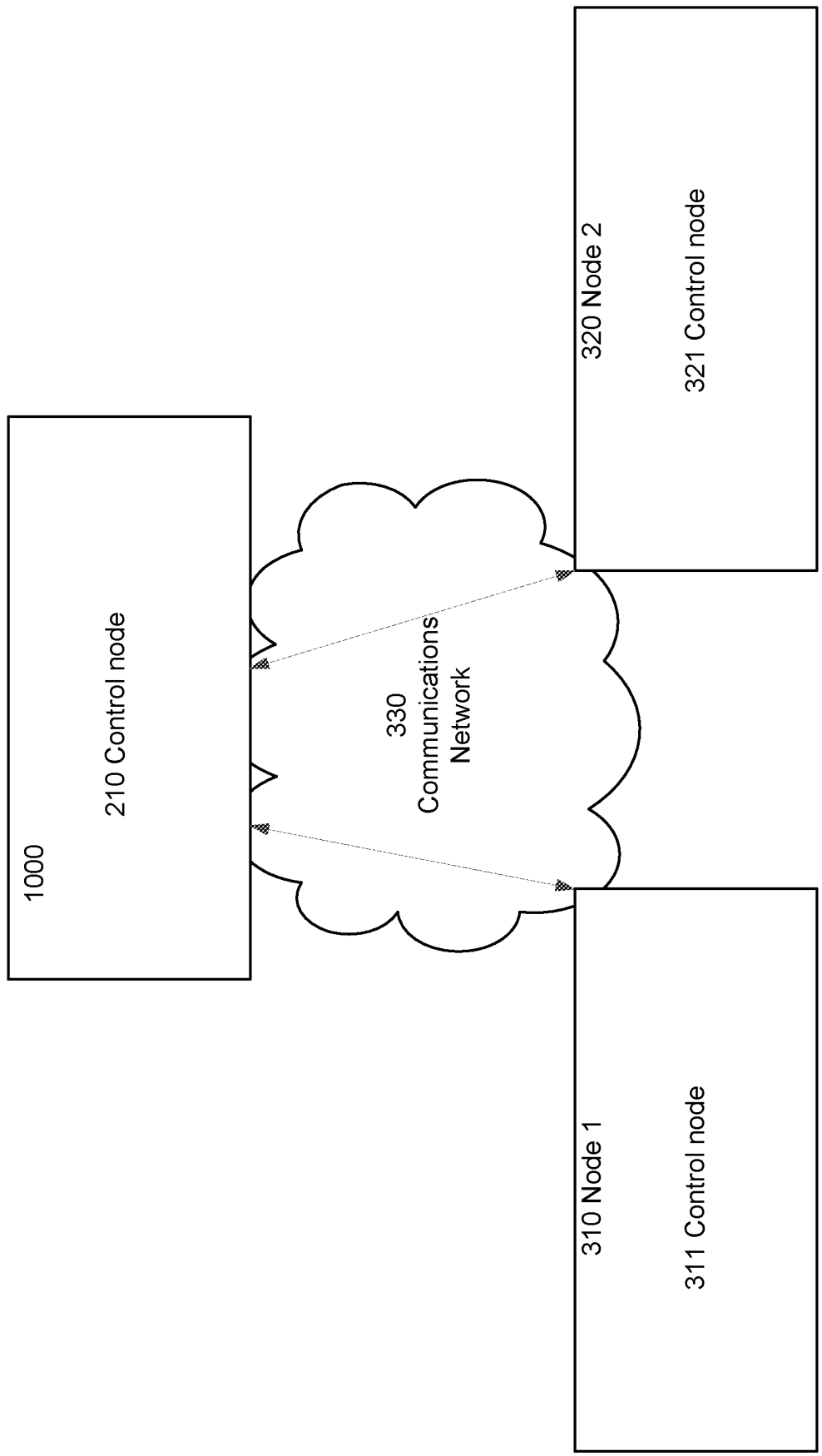
FIG. 3 illustrates multi-node deployment according to one or more embodiments of the present disclosure.

FIG. 3 illustrates multi-node deployment according to one or more embodiments of the present disclosure. FIG. 3 shows a variation or embodiment of the present disclosure where the method also comprises admitting and reassigning processes to be run at other nodes, i.e. multi-node deployment. The computer system 1000 comprising the process control node 210 is communicatively coupled to a communications network 330. A second computer system 310 comprising a second process control node 311 is also communicatively coupled to the communications network 330. A third computer system 310 comprising a second process control node 321 is also communicatively coupled to the communications network 330.

In one embodiment, the process control node 210 could, in case of failure of a process to pass either evaluation of scheduling test/multi-tenancy admission check or EDF admission check, the process control node 210 communicate with corresponding process control nodes 311, 321 on other computer systems/nodes 310, 320 to discover if the process, for which a resource request is made, could be started on a different node 310, 320 without violating either the tenant quota demands or EDF scheduling restrictions. This extends the method by adding a communication step between multiple process control nodes 210, 310, 320 before rejecting a request.

Figure 4:
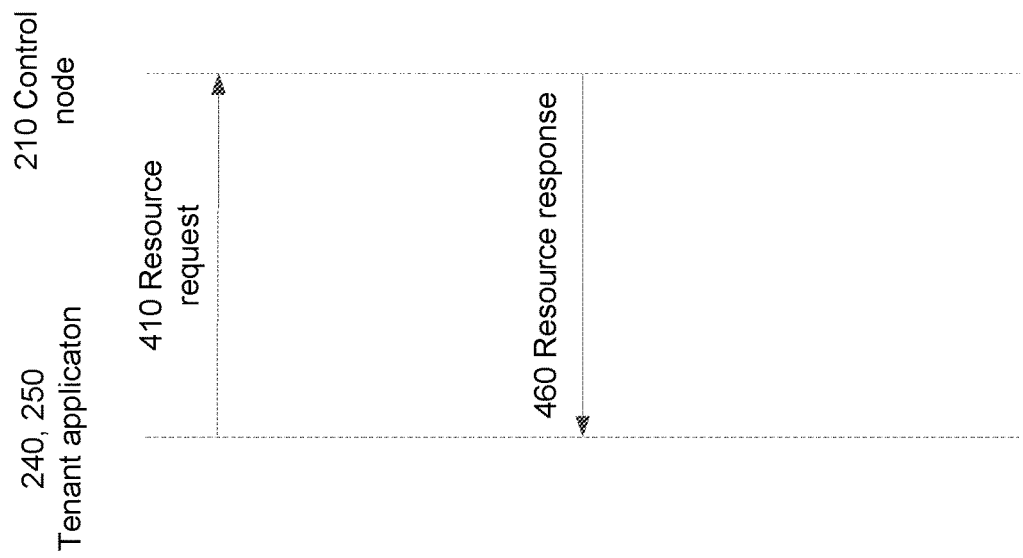
FIG. 4 shows a signaling chart according to one or more embodiments of the present disclosure.

FIG. 4 shows a signaling chart according to one or more embodiments of the present disclosure. A tenant application 240, 250 sends a resource request 410 to the process control node 210. The resource request 410 is indicative of resources requested to be allocated, by the process control node, for one or more real-time processes of the tenant application. The resource request 410 may be comprised in a signal, any suitable signal available in the art.

Examples of resources that may be requested in the request are processing or networking resources such as CPU time and/or communication buffer space allocation.

The process control node 210 then evaluates a scheduling test to determine if a set of processing resources, indicated by the resource request, can be allocated from the shared resources, controlled by the process control node 210, by determining if resources requested by the resource request are available and/or can be allocated. In one embodiment, the shared resources are resources allocated to a particular tenant application.

If it is determined that the requested resources can be allocated from the shared resources, the one or more real-time processes of the tenant application are started within a resource partition/run space/container name space of the tenant application.

Updated resource quotas and priorities for non real-time processes comprised by the tenant application are then calculated.

Finally, a resource response 460 is transmitted back to the tenant application 240, 250. The resource response may e.g. comprise a selection of identifier of the newly started process and the updated resource quotas and priorities for non real-time processes comprised by the tenant application in case of success. In case of failure to successfully evaluate the request, the resource response 460 may e.g. comprise an error code indicating the reason for the failure.

Figure 5:
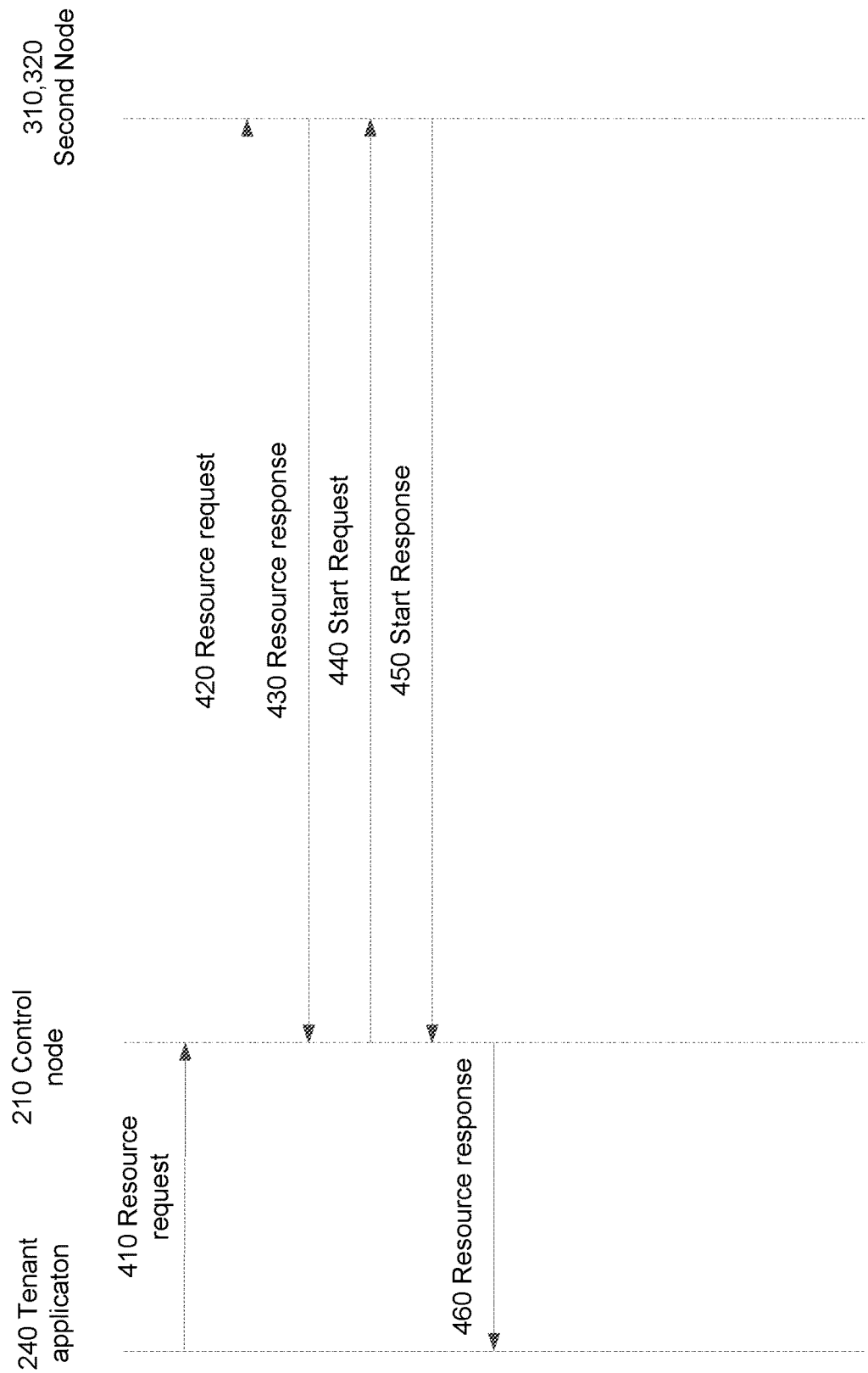
FIG. 5 shows a further signaling chart according to one or more embodiments of the present disclosure.

FIG. 5 shows a further signaling chart according to one or more embodiments of the present disclosure. In a similar manner to what is described in relation to FIG. 4, the tenant application 240, 250 sends the resource request 410 to the process control node 210. The resource request 410 is indicative of resources requested to be allocated, by the process control node, for one or more real-time processes of the tenant application. The resource request may be comprised in a signal, any suitable signal available in the art.

Examples of resources that may be requested in the request are processing or networking resources such as CPU time and/or communication buffer space allocation.

The process control node 210 then evaluates a scheduling test to determine if a set of processing resources, indicated by the resource request 410, can be allocated from the shared resources, controlled by the process control node 210, by determining if resources requested by the resource request are available and/or can be allocated.

If it is determined that the requested resources cannot be allocated from the shared resources, the process control node 210 then sends a second resource request 420, to a second node 310, 320, where the second request 420 comprises all or at least a part of information comprised in the first resource request 410.

The second node 310, 320, then receives the second resource request 420, from the process control node 210.

The second resource request 420 being indicative of resources requested to be allocated by the second node 310, 320.

The second node 310, 320, then evaluates a second scheduling test by performing a second determination if the resources requested by the resource request can be allocated, typically from resources controlled by the second node.

The second node 310, 320, then sends a resource response 430, to the process control node, indicative of the second determination. E.g. a positive or negative indication that an allocation of the requested resources is possible.

The process control node 210 then receives the second resource response 430, from the second node 310, 320, being indicative of a second determination indicative of whether or not the requested resources can be allocated from a second set of resources controlled by the second node.

If the requested resources can be allocated from the second set of resources, the process control node 210 then sends a start request 440, to the second node 310, 320, being indicative of instructions to start the one or more real-time processes of the tenant application on the second node, i.e. using processing resources of the second node 310, 320.

The second node 310, 320, then receives the start request 440, from the process control node 210, the start request 440 being indicative of instructions to start the one or more real-time processes of the tenant application on the second node.

The second node 310, 320, then starts the one or more real-time processes of the tenant application and sends a start response 450, to the process control node 210. Updated resource quotas and priorities for non real-time processes comprised by the tenant application may then be calculated. The start response may e.g. comprise a selection of identifier of the newly started process and the updated resource quotas and priorities for non real-time processes comprised by the tenant application in case of success. In case of failure to successfully evaluate the request resource response may e.g. comprise an error code indicating the reason for the failure.

The process control node 210 then receives the start response 450, from the second node. In case of successfully evaluating the request, the process control node 210 then transmits the resource response 460, to the tenant application, where the resource response 460 comprises the start response 450 or at least part of the information comprised in the start response 450. In case of failure to successfully evaluate the request, the resource response 460 may e.g. comprise an error code indicating the reason for the failure.

Figure 6:
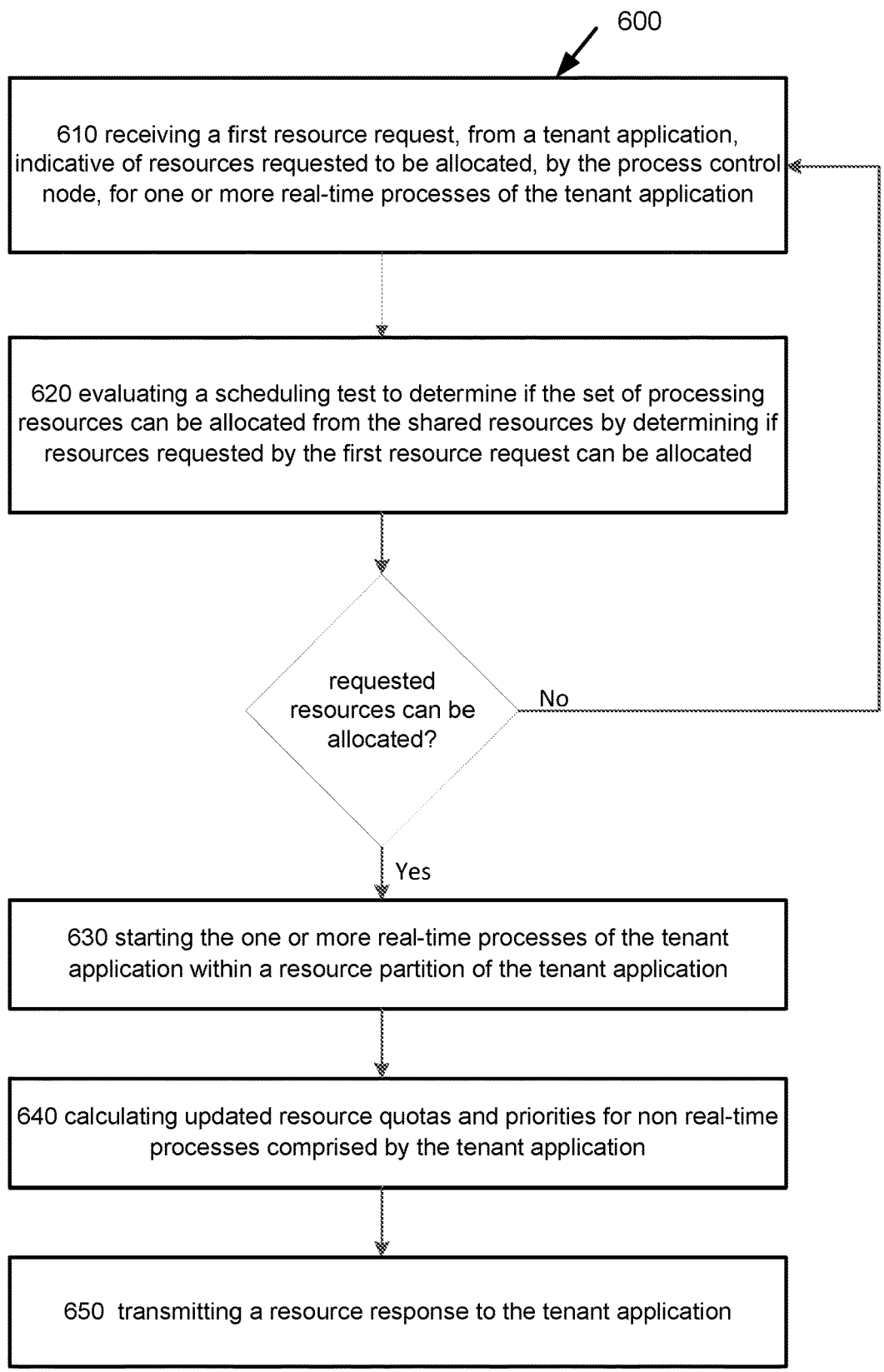
FIG. 6 shows flow chart of a method according to one or more embodiments of the present disclosure.

FIG. 6 shows flow chart of a method according to one or more embodiments of the present disclosure. The method is performed by the process control node 210 configured to allocate resources shared by a plurality of tenant applications. Each tenant application comprises a selection of non real-time processes and real-time processes. The method comprises:

Step 610: receiving a first resource request, from a tenant application. The first resource request being indicative of resources requested to be allocated, by the process control node, for one or more real-time processes of the tenant application.

Step 620: evaluating a scheduling test to determine if the set of processing resources can be allocated from the shared resources by determining if resources requested by the first resource request can be allocated.

If it is determined that the requested resources can be allocated from the shared resources, the method further comprises performing the steps:

Step 630: starting the one or more real-time processes of the tenant application within a resource partition of the tenant application, Step 640: calculating updated resource quotas and priorities for non real-time processes comprised by the tenant application, Step 650: transmitting a resource response to the tenant application.

In one example, the tenant applications at an edge cloud node provide voice over IP VoIP services, online gaming services, or video conferencing services. As mentioned before, one major concern arising from multi-tenancy is the lack of performance isolation. When resource requirements from multiple tenants contend for shared resources, one tenant's performance may be affected by the resource use of another tenant.

In this example, the process control node receives a first resource request, from a requesting tenant application. The request is indicative of CPU processing resources requested to be allocated, by the process control node, for one or more real-time processes of the requesting tenant application. The request may e.g. indicate that 10% processing time from a resource scheduling period is needed to tune the requested real-time process. The process control node evaluates a scheduling test to determine if the set of processing resources can be allocated from the shared resources by determining if resources requested by the first resource request can be allocated. The process control node may e.g. determine that 30% of each resource scheduling period have already been allocated, and that this can safely be increased to 40% by allowing the requested real-time process to run. if it is determined that the requested resources can be allocated from the shared resources, the process control node further performs the steps of starting the requested real-time process of the tenant application within a resource partition of the tenant application, i.e. within the run space of the tenant application, as further described in relation to FIG. 1. The process control node further calculates updated resource quotas and priorities for all of the non real-time processes comprised by the tenant applications run space. The process control node then transmitting a first resource response to the tenant application, e.g. transmits the process identity of the requested real-time process.

In one embodiment, the requested resources are processing resources such as CPU processing time or a percentage of all available processing time of each resource scheduling period.

In this embodiment, the requested resources are at least indicative of a set of processing resources required to start the one or more real-time processes, and where the determination comprises at least determining if the set of processing resources can be allocated by comparing the set of processing resources to a second set of processing resources already allocated and a total resource quota of the tenant application.

In one example, 10% processing time of each resource scheduling period is requested, which is compared to a total already allocated resources, e.g. 30% of each resource scheduling period, and a resource quota of the tenant application set to 50%, as further described in relation to FIG. 2.

Additionally or alternatively, the set of processing resources are at least defined by parameters indicative of a resource scheduling period, a requested runtime period being a fraction of the scheduling period, and a maximum delay from a start of the resource scheduling period Additionally or alternatively, the requested resources are communication resources such as a fraction of a transmission data buffer. In this embodiment, the requested resources are at least indicative of a set of communication resources required to exchange data to/from the one or more real-time processes. The determination comprises at least determining if the set of communication resources can be allocated by comparing the set of communication resources to a second set of set of communication resources already allocated and a total resource quota of the tenant application. Additionally or alternatively, the communication resources are at least defined by parameters indicative of a reserved fraction of a data buffer reserved for the one or more real-time processes.

In a further aspect of the disclosure, the resources of a second node, other than the one comprising the process control node initially receiving the resource request, is requested to accommodate the resource request. In this embodiment, if it is determined that the requested resources cannot be allocated from the shared resources of the process control node initially receiving the resource request, the method further comprises the steps of sending a second resource request, to a second node such as a second edge cloud node, the second request comprising the first resource request, receiving a second resource response, from the second node indicative of a second determination indicative of whether or not the requested resources can be allocated from a second set of resources controlled by the second node. If the requested resources can be allocated from the second set of resources, the method further comprises the steps sending a start request, to the second node, indicative of instructions to start the one or more real-time processes of the tenant application on the second node, receiving a start response, from the second node, transmitting the resource response, to the tenant application, the resource response comprising the start response.

In one example, the resources of a second edge node are requested to accommodate the first and initial resource request 410. After it is determined that the requested resources cannot be allocated from the shared resources of a first edge node, the method further comprises the steps of sending a second resource request 420, to a second edge node 310, 320, the second request 420 comprising the same information or at least part of the information of the first resource request 410, receiving a second resource response 430, from the second edge node indicative of a second determination indicative of whether or not the requested resources can be allocated from a second set of resources controlled by the second edge node. If so, a start request 440 is sent to the second node, to start the one or more requested real-time processes of the tenant application on the second edge node. The second edge node then responds with a start response 450. The first resource response 460 can then be sent to the tenant application, indicative of that the requested real-time process has been started on the second edge node.

According to a further aspect of the invention, a second edge node is provided that can support the requesting application with resources. In one embodiment, a method is performed by a second node configured to allocate resources from a set of resources controlled by the second node. The method comprises receiving a resource request, from a process control node, indicative of resources requested to be allocated by the second node, evaluating a scheduling test by determining if the resources requested by the resource request can be allocated, sending a resource response, to the process control node, indicative of the determination. If the requested resources can be allocated from the set of resources controlled by the second node, the method further comprises the steps receiving a start request, from the process control node, indicative of instructions to start one or more real-time processes of a tenant application on the second node, starting the one or more real-time processes of the tenant application, and sending a start response, to the process control node.

Additionally or alternatively, the requested resources are at least indicative of a set of processing resources required to start the one or more real-time processes, and where the determination comprises at least determining if the set of processing resources can be allocated by comparing the set of processing resources to the set of resources controlled by the second node and a total resource quota of the tenant application.

Additionally or alternatively, the set of processing resources are at least defined by parameters indicative of a resource scheduling period, a requested runtime period being a fraction of the scheduling period, and a maximum delay from a start of the resource scheduling period.

Additionally or alternatively, the requested resources are at least indicative of a set of communication resources required to exchange data to/from the one or more real-time processes, where the determination comprises at least determining if the set of communication resources can be allocated by comparing the set of communication resources to the set of resources controlled by the second node and a total resource quota of the tenant application.

Additionally or alternatively, the communication resources are at least defined by parameters indicative of a reserved fraction of a data buffer reserved for the one or more real-time processes.

According to a further aspect of the disclosure, a process control node 210 is provided that can support the requesting application with resources. In one embodiment, a process control node 210 is provided and is configured to allocate resources shared by a plurality of tenant applications, wherein each tenant application comprises a selection of non real-time processes and real-time processes. The control node comprises processing circuitry 1012, a memory 1015 comprising instructions executable by the processing circuitry 1012, causing the processing circuitry 1012 to receive a first resource request, from a tenant application, indicative of resources requested to be allocated, by the process control node, for one or more real-time processes of the tenant application, evaluate a scheduling test to determine if the set of processing resources can be allocated from the shared resources by determining if resources requested by the first resource request can be allocated, and if it is determined that the requested resources can be allocated from the shared resources, the processing circuitry 1012 is further caused to perform the steps to start the one or more real-time processes of the tenant application within a resource partition of the tenant application, to calculate updated resource quotas and priorities for non real-time processes comprised by the tenant application, and to transmit a resource response to the tenant application.

Additionally or alternatively, the requested resources are at least indicative of a set of processing resources required to start the one or more real-time processes, and where the determination comprises at least determining if the set of processing resources can be allocated by comparing the set of processing resources to a second set of processing resources already allocated and a total resource quota of the tenant application.

Additionally or alternatively, the set of processing resources are at least defined by parameters indicative of a resource scheduling period, a requested runtime period being a fraction of the scheduling period, and a maximum delay from a start of the resource scheduling period Additionally or alternatively, the requested resources are at least indicative of a set of communication resources required to exchange data to/from the one or more real-time processes, where the determination comprises at least determining if the set of communication resources can be allocated by comparing the set of communication resources to a second set of set of communication resources already allocated and a total resource quota of the tenant application.

Additionally or alternatively, the communication resources are at least defined by parameters indicative of a reserved fraction of a data buffer reserved for the one or more real-time processes.

Additionally or alternatively, if it is determined that the requested resources cannot be allocated from the shared resources the processing circuitry 1012 is further caused perform the steps to send a second resource request, to a second node, the second request comprising the first resource request, to receive a second resource response, from the second node indicative of a second determination indicative of whether or not the requested resources can be allocated from a second set of resources controlled by the second node, and if the requested resources can be allocated from the second set of resources, the processing circuitry 1012 is further caused to send a start request, to the second node, indicative of instructions to start the one or more real-time processes of the tenant application on the second node, to receive a start response, from the second node, and to transmit the resource response, to the tenant application, the resource response comprising the start response.

According to a further aspect of the disclosure, a node (310, 320) is provided and configured to allocate resources from a set of resources controlled by the node, the node is configured to receive a resource request, from a process control node, indicative of resources requested to be allocated by the node, evaluate a scheduling test by determining if the resources requested by the resource request can be allocated and to send a resource response, to the process control node, indicative of the determination. If the requested resources can be allocated from the set of resources controlled by the node, the node is further configured to receive a start request, from the process control node, indicative of instructions to start one or more real-time processes of a tenant application on the node, to start the one or more real-time processes of the tenant application, and to send a start response, to the process control node.

Additionally or alternatively, the requested resources are at least indicative of a set of processing resources required to start the one or more real-time processes, and where the determination comprises at least determining if the set of processing resources can be allocated by comparing the set of processing resources to the set of resources controlled by the node and a total resource quota of the tenant application.

Additionally or alternatively, the set of processing resources are at least defined by parameters indicative of a resource scheduling period, a requested runtime period being a fraction of the scheduling period, and a maximum delay from a start of the resource scheduling period Additionally or alternatively, the requested resources are at least indicative of a set of communication resources required to exchange data to/from the one or more real-time processes, where the determination comprises at least determining if the set of communication resources can be allocated by comparing the set of communication resources to the set of resources controlled by the node and a total resource quota of the tenant application.

Additionally or alternatively, the communication resources are at least defined by parameters indicative of a reserved fraction of a data buffer reserved for the one or more real-time processes.

According to a further aspect of the disclosure, a computer program is provided and comprising computer-executable instructions for causing a node 1000, 310, 320, when the computer-executable instructions are executed on processing circuitry 1012 comprised in the node 1000, 310, 320, to perform any of the method steps according described herein.

According to a further aspect of the disclosure, a computer program product is provided comprising a computer-readable storage medium, the computer-readable storage medium having the computer program described above embodied therein.

According to a further aspect of the disclosure, a carrier is provided and containing the computer program described above, wherein the carrier is one of an electronic signal, optical signal, radio signal, or computer readable storage medium.

Figure 7:
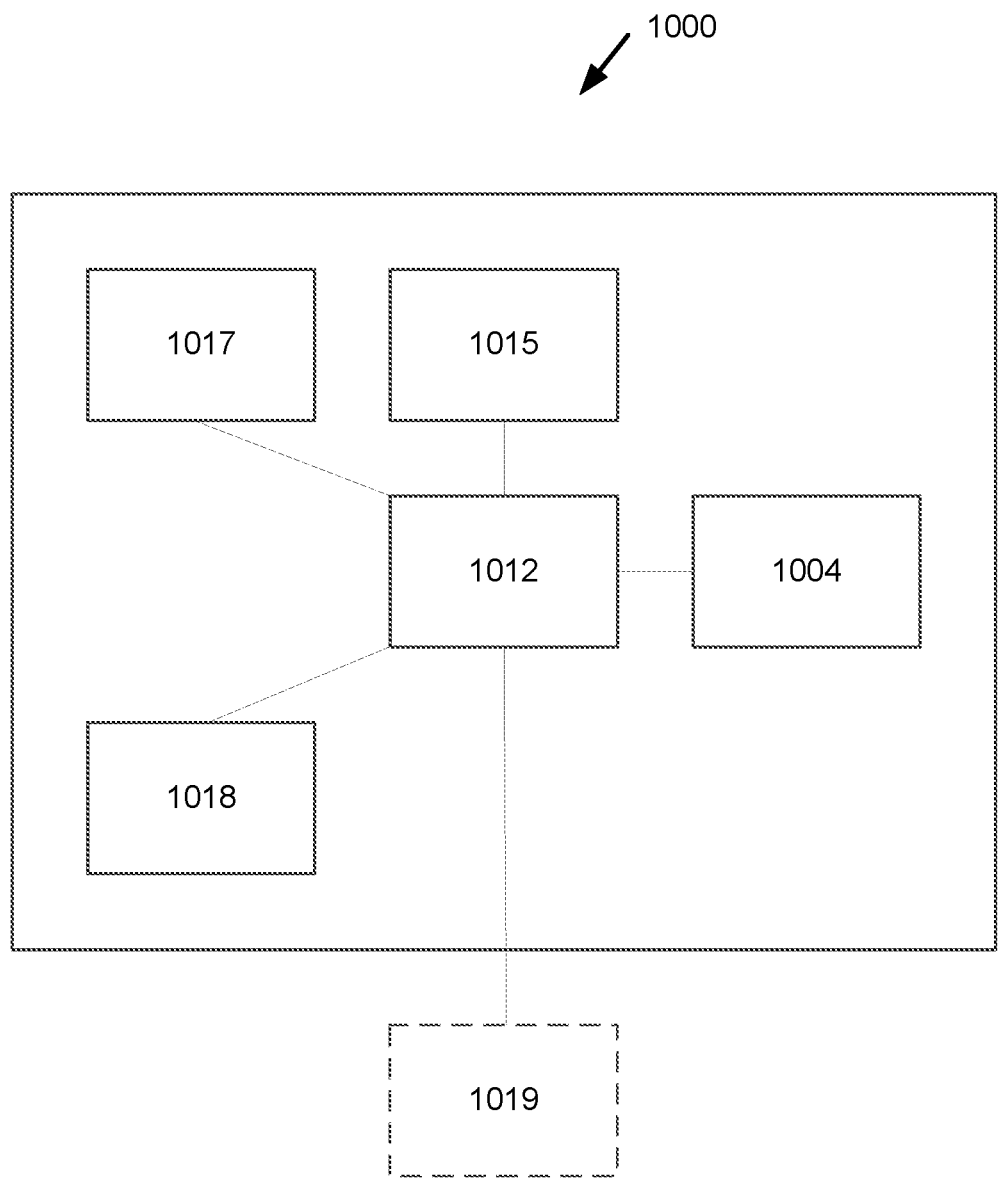
FIG. 7 shows details of a computer device/system according to one or more embodiments.

FIG. 7 shows details of a node/computer device/computer system 1000 according to one or more embodiments of the present disclosure. The computer device 1000 may be in the form of a selection of any of network node, a desktop computer, server, laptop, mobile device, a smartphone, a tablet computer, a smart-watch etc. The computer device 1000 may comprise processing circuitry 1012. The computer device 1000 may optionally comprise a communications interface 1004 for wired and/or wireless communication. Further, the computer device 1000 may further comprise at least one optional antenna (not shown in figure). The antenna may be coupled to a transceiver of the communications interface 1004 and is configured to transmit and/or emit and/or receive a wireless signals, e.g. in a wireless communication system.

In one example, the processing circuitry 1012 may be any of a selection of processor and/or a central processing unit and/or processor modules and/or multiple processors configured to cooperate with each-other. Further, the computer device 1000 may further comprise a memory 1015. The memory 1015 may contain instructions executable by the processing circuitry 1012, that when executed causes the processing circuitry 1012 to perform any of the methods and/or method steps described herein.

The communications interface 1004, e.g. the wireless transceiver and/or a wired/wireless communications network adapter, which is configured to send and/or receive data values or parameters as a signal to or from the processing circuitry 1012 to or from other external nodes In an embodiment, the communications interface 1004 communicates directly between nodes or via a communications network.

In one or more embodiments the computer device 1000 may further comprise an input device 1017, configured to receive input or indications from a user and send a user-input signal indicative of the user input or indications to the processing circuitry 1012.

In one or more embodiments the computer device 1000 may further comprise a display 1018 configured to receive a display signal indicative of rendered objects, such as text or graphical user input objects, from the processing circuitry 1012 and to display the received signal as objects, such as text or graphical user input objects.

In one embodiment the display 1018 is integrated with the user input device 1017 and is configured to receive a display signal indicative of rendered objects, such as text or graphical user input objects, from the processing circuitry 1012 and to display the received signal as objects, such as text or graphical user input objects, and/or configured to receive input or indications from a user and send a user-input signal indicative of the user input or indications to the processing circuitry 1012.

In one or more embodiments the computer device 1000 may further comprise one or more sensors 1019.

In embodiments, the processing circuitry 1012 is communicatively coupled to the memory 1015 and/or the communications interface 1004 and/or the input device 1017 and/or the display 1018 and/or the one or more sensors 419.

In embodiments, the communications interface and/or transceiver 1004 communicates using wired and/or wireless communication techniques.

In embodiments, the one or more memory 1015 may comprise a selection of a hard RAM, disk drive, a floppy disk drive, a magnetic tape drive, an optical disk drive, a CD or DVD drive (R or RW), or other removable or fixed media drive.

In a further embodiment, the computer device 1000 may further comprise and/or be coupled to one or more additional sensors (not shown) configured to receive and/or obtain and/or measure physical properties pertaining to the computer device or the environment of the computer device, and send one or more sensor signals indicative of the physical properties to the processing circuitry 1012.

It is to be understood that a computer device comprises any suitable combination of hardware and/or software needed to perform the tasks, features, functions and methods disclosed herein. Moreover, while the components of the computer device are depicted as single boxes located within a larger box, or nested within multiple boxes, in practice, a computer device may comprise multiple different physical components that make up a single illustrated component (e.g., memory 1015 may comprise multiple separate hard drives as well as multiple RAM modules).

Similarly, the computer device 1000 may be composed of multiple physically separate components, which may each have their own respective components.

The communications interface 1004 may also include multiple sets of various illustrated components for different wireless technologies, such as, for example, GSM, WCDMA, LTE, NR, WiFi, or Bluetooth wireless technologies. These wireless technologies may be integrated into the same or different chip or set of chips and other components within the computer device 1000.

Processing circuitry 1012 is configured to perform any determining, calculating, or similar operations (e.g., certain obtaining operations) described herein as being provided by a computer device 1000. These operations performed by processing circuitry 1012 may include processing information obtained by processing circuitry 1012 by, for example, converting the obtained information into other information, comparing the obtained information or converted information to information stored in the network node, and/or performing one or more operations based on the obtained information or converted information, and as a result of said processing making a determination.

Processing circuitry 1012 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other computer device 1000 components, such as device readable medium, computer 1000 functionality. For example, processing circuitry 1012 may execute instructions stored in device readable medium 1015 or in memory within processing circuitry 1012. Such functionality may include providing any of the various wireless features, functions, or benefits discussed herein. In some embodiments, processing circuitry 1012 may include a system on a chip.

In some embodiments, processing circuitry 1012 may include one or more of radio frequency, RF, transceiver circuitry and baseband processing circuitry. In some embodiments, RF transceiver circuitry and baseband processing circuitry may be on separate chips or sets of chips, boards, or units, such as radio units and digital units. In alternative embodiments, part or all of RF transceiver circuitry and baseband processing circuitry may be on the same chip or set of chips, boards, or units In certain embodiments, some or all of the functionality described herein as being provided by a computer device 1000 may be performed by the processing circuitry 1012 executing instructions stored on device readable medium 1015 or memory within processing circuitry 1012. In alternative embodiments, some or all of the functionality may be provided by processing circuitry 1012 without executing instructions stored on a separate or discrete device readable medium, such as in a hard-wired manner. In any of those embodiments, whether executing instructions stored on a device readable storage medium or not, processing circuitry 1012 can be configured to perform the described functionality. The benefits provided by such functionality are not limited to processing circuitry 1012 alone or to other components of computer device 1000, but are enjoyed by computer device 1000 as a whole, and/or by end users.

Device readable medium or memory 1015 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1012. Device readable medium 1015 may store any suitable instructions, data or information, including a computer program, software, an application including one or more of logic, rules, code, tables, etc. and/or other instructions capable of being executed by processing circuitry 1012 and, utilized by computer device 1000. Device readable medium QQ180 may be used to store any calculations made by processing circuitry 1012 and/or any data received via interface 1004. In some embodiments, processing circuitry 1012 and device readable medium 1015 may be considered to be integrated.

The communications interface 1004 is used in the wired or wireless communication of signaling and/or data between computer device 1000 and other nodes. Interface 1004 may comprise port(s)/terminal(s) to send and receive data, for example to and from computer device 1000 over a wired connection. Interface 1004 also includes radio front end circuitry that may be coupled to, or in certain embodiments a part of, an antenna. Radio front end circuitry may comprise filters and amplifiers. Radio front end circuitry may be connected to the antenna and/or processing circuitry 1012.

Examples of a computer device 1000 include, but are not limited to an edge cloud node, a smart phone, a mobile phone, a cell phone, a voice over IP (VoIP) phone, a wireless local loop phone, a tablet computer, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

The communication interface may 1004 encompass wired and/or wireless networks such as a local-area network (LAN), a wide-area network (WAN), a computer network, a wireless network, a telecommunications network, another like network or any combination thereof. The communication interface may be configured to include a receiver and a transmitter interface used to communicate with one or more other devices over a communication network according to one or more communication protocols, such as Ethernet, TCP/IP, SONET, ATM, optical, electrical, and the like). The transmitter and receiver interface may share circuit components, software or firmware, or alternatively may be implemented separately.

In one embodiment, a computer device 1000 is provided and is configured to perform any of the method steps described herein.

In one embodiment, computer device 1000 comprises any one of the nodes or the process control node.

In one embodiment, each of the nodes or the process control node comprises all or a selection of the features of the computer device 1000 described in relation to FIG. 7.

Figure 8:
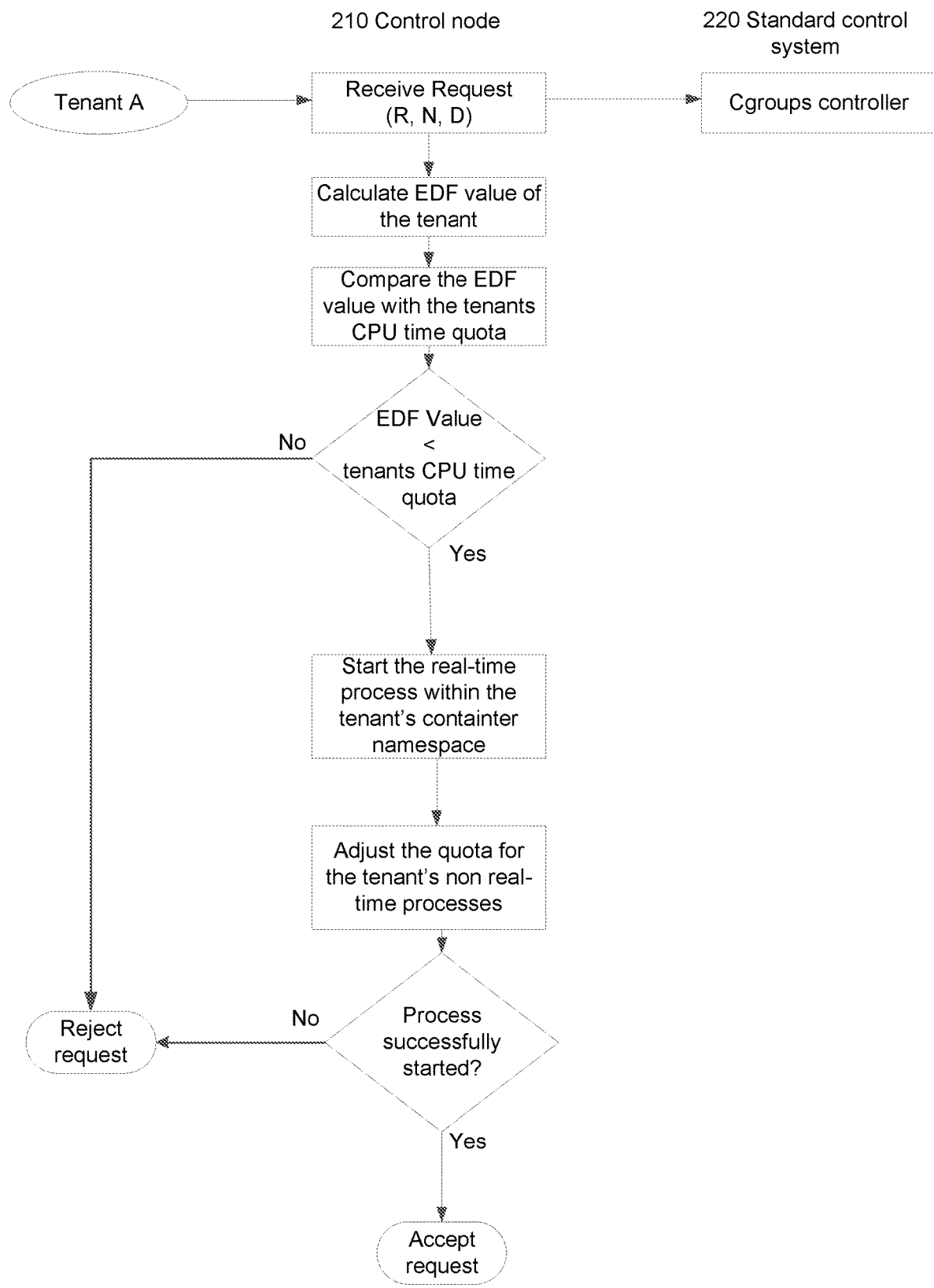
FIG. 8 illustrates flow chart of a use case according to one or more embodiments of the present disclosure.

FIG. 8 illustrates flow chart of a use case of the method according to one or more embodiments of the present disclosure. In the use case, each node in the edge cloud cluster runs the process control node/multi-tenant RT controller. The process control node would do the following:

1. Admission:
  a. Receives requests, from a tenant, to start real-time processes, annotated with the three parameters Runtime, Period and Deadline.
  b. Run a schedulability test to decide whether the new real-time process can be scheduled or not, given already started real time and non-realtime processes processes:
  i. Calculating the EDF value, EDF value=Sum the Runtimes/Period values for other real-time processes of the same tenant!
  c. Compare the EDF value to total assigned quota to the tenant, e.g. 50% per second. If the new value is below the assigned quota, the new real-time request is admitted!
2. Execution:
a. Start the real-time process within the tenant's container namespace, setting the requested EDF parameters.
  i. To prevent the tenant process to change it's own scheduling requirements, the necessary library/system calls are disabled for the tenants real-time process by the multi-tenant RT controller.
  b. Re-adjust the tenant's quotas and priorities of non real-time processes, so that the sum of real-time and non real-time process quota matches the total assigned quota.
  c. Reply to the request with either an identifier of the newly started process in case of success, or with an error code in case of failure.

Finally, it should be understood that the invention is not limited to the embodiments described above, but also relates to and incorporates all embodiments within the scope of the appended independent claims.

The invention claimed is:

1. A method performed by a process control node configured to allocate resources shared by a plurality of tenant applications, wherein each tenant application comprises a selection of non real-time processes and real-time processes, the method comprising:
  receiving a first resource request, from a tenant application, indicative of resources requested to be allocated, by the process control node, for one or more real-time processes of the tenant application, wherein the requested resources are at least indicative of a set of processing resources required to start the one or more real-time processes, and wherein the set of processing resources are at least defined by parameters indicative of a resource scheduling period, a requested runtime period being a fraction of the scheduling period, and a maximum delay from a start of the resource scheduling period,
  evaluating a scheduling test to determine if the set of processing resources can be allocated from the shared resources by determining if resources requested by the first resource request can be allocated, wherein the determination comprises at least determining if the set of processing resources can be allocated by comparing the set of processing resources to a second set of processing resources already allocated and a total resource quota of the tenant application, and
  if it is determined that the requested resources can be allocated from the shared resources, the method further comprises performing the steps:
    starting the one or more real-time processes of the tenant application within a resource partition of the tenant application,
    calculating updated resource quotas and priorities for non real-time processes comprised by the tenant application,
    transmitting a first resource response to the tenant application.

2. The method according to claim 1 wherein the requested resources are at least indicative of a set of communication resources required to exchange data to/from the one or more real-time processes,
  wherein the determination comprises at least determining if the set of communication resources can be allocated by comparing the set of communication resources to a second set of set of communication resources already allocated and a total resource quota of the tenant application.

3. The method according to claim 2, wherein the communication resources are at least defined by parameters indicative of a reserved fraction of a data buffer reserved for the one or more real-time processes.

4. The method according to claim 1, if it is determined that the requested resources cannot be allocated from the shared resources to further perform the steps:
  sending a second resource request, to a second node, the second request comprising the first resource request,
  receiving a second resource response, from the second node indicative of a second determination indicative of whether or not the requested resources can be allocated from a second set of resources controlled by the second node, and
  if the requested resources can be allocated from the second set of resources, the method further comprises the steps:

sending a start request, to the second node, indicative of instructions to start the one or more real-time processes of the tenant application on the second node, receiving a start response, from the second node, transmitting the first resource response, to the tenant application, the resource response comprising the start response.

5. The method according to claim 1, wherein the requested resources are at least indicative of a set of communication resources required to exchange data to/from the one or more real-time processes, and wherein the communication resources are at least defined by parameters indicative of a reserved fraction of a data buffer reserved for the one or more real-time processes.

6. A process control node configured to allocate resources shared by a plurality of tenant applications, wherein each tenant application comprises a selection of non real-time processes and real-time processes, the control node comprising:

processing circuitry, a memory comprising instructions executable by the processing circuitry, causing the processing circuitry to receive a first resource request, from a tenant application, indicative of resources requested to be allocated, by the process control node, for one or more real-time processes of the tenant application, wherein the requested resources are at least indicative of a set of processing resources required to start the one or more real-time processes, and wherein the set of processing resources are at least defined by parameters indicative of a resource scheduling period, a requested runtime period being a fraction of the scheduling period, and a maximum delay from a start of the resource scheduling period, evaluate a scheduling test to determine if the set of processing resources can be allocated from the shared resources by determining if resources requested by the first resource request can be allocated, wherein the determination comprises at least determining if the set of processing resources can be allocated by comparing the set of processing resources to a second set of processing resources already allocated and a total resource quota of the tenant application, and if it is determined that the requested resources can be allocated from the shared resources, the processing circuitry is further caused to perform the steps:

start the one or more real-time processes of the tenant application within a resource partition of the tenant application, calculate updated resource quotas and priorities for non real-time processes comprised by the tenant application, transmit a resource response to the tenant application.

7. The control node according to claim 6, wherein the requested resources are at least indicative of a set of communication resources required to exchange data to/from the one or more real-time processes, wherein the determination comprises at least determining if the set of communication resources can be allocated by comparing the set of communication resources to a second set of set of communication resources already allocated and a total resource quota of the tenant application.

8. A computer program product comprising a computer-readable non-transitory storage medium, the computer-readable non-transitory storage medium comprising computer-executable instructions for causing a node, when the computer-executable instructions are executed on processing circuitry comprised in the node, to perform any of the method steps according to claim 1.

* * * * *